US008589293B2

(12) United States Patent
Singh

(10) Patent No.: US 8,589,293 B2
(45) Date of Patent: *Nov. 19, 2013

(54) MESSAGE ROUTING USING LOGICALLY INDEPENDENT RECIPIENT IDENTIFIERS

(71) Applicant: Shantnu Singh, Singapore (SG)

(72) Inventor: Shantnu Singh, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,189

(22) Filed: Oct. 12, 2012

(65) Prior Publication Data
US 2013/0023294 A1 Jan. 24, 2013

Related U.S. Application Data

(63) Continuation of application No. 13/445,357, filed on Apr. 12, 2012.

(60) Provisional application No. 61/475,135, filed on Apr. 13, 2011.

(51) Int. Cl.
G06Q 40/00 (2012.01)

(52) U.S. Cl.
USPC .............................. 705/39; 705/44

(58) Field of Classification Search
USPC .............................. 705/39, 35, 44
See application file for complete search history.

(56) References Cited

U.S. PATENT DOCUMENTS 7,146,338 B2 * 12/2006 Kight et al. ..................... 705/42
7,848,980 B2 12/2010 Carlson
7,992,792 B2 8/2011 Van Rensburg
8,160,959 B2 4/2012 Rackley, III et al.
8,364,550 B2 1/2013 Van Rensburg
2002/0147685 A1* 10/2002 Kwan ............................. 705/44
2005/0071179 A1* 3/2005 Peters et al. ...................... 705/1
2007/0038519 A1* 2/2007 Johansson et al. .............. 705/26

(Continued)

FOREIGN PATENT DOCUMENTS

EP 1351531 A1 10/2003
EP 1980985 A2 10/2008

(Continued)

OTHER PUBLICATIONS

International Search Report and Written Opinion of International Patent Application No. PCT/US2012/033361, mailed Oct. 31, 2012, 9 pages.

Primary Examiner — Jagdish Patel
(74) Attorney, Agent, or Firm — Kilpatrick Townsend & Stockton LLP

(57) ABSTRACT

Embodiments are directed to methods for routing messages using logically independent recipient identifiers and server computers operable to implement those methods. In one embodiment, an authorization request message is received at the server computer from a sending institution. The authorization request message comprises a non-financial institution identifier and a recipient identifier separate from the non-financial institution identifier, the non-financial institution identifier identifying a non-financial institution, the recipient identifier associated with a recipient, wherein the authorization request message requests authorization for a transaction between a sender and the recipient. The server computer then determines the non-financial institution from a number of different non-financial institutions, routes the authorization request message to the non-financial institution, and receives, from the non-financial institution, an authorization response message, the authorization response message indicating whether or not the transaction is approved.

20 Claims, 12 Drawing Sheets

(56) References Cited

U.S. PATENT DOCUMENTS

| | | |
|---|---|---|
| 2007/0061396 A1 | 3/2007 | Morris |
| 2007/0106564 A1 | 5/2007 | Matotek et al. |
| 2007/0106604 A1 | 5/2007 | Van Rensburg et al. |
| 2009/0106152 A1* | 4/2009 | Dill et al. .................. 705/44 |
| 2009/0234772 A1 | 9/2009 | Van Rensburg et al. |
| 2009/0281948 A1 | 11/2009 | Carlson |
| 2010/0145851 A1 | 6/2010 | Van Rensburg et al. |
| 2010/0250436 A1 | 9/2010 | Loevenguth et al. |
| 2010/0280949 A1 | 11/2010 | Van Rensburg |
| 2011/0251952 A1 | 10/2011 | Kelly et al. |
| 2011/0258115 A1 | 10/2011 | Mulhim |
| 2012/0265684 A1 | 10/2012 | Singh |

FOREIGN PATENT DOCUMENTS

| | | |
|---|---|---|
| KR | 10-2009-0000787 A | 1/2009 |
| KR | 10-0914513 B1 | 9/2009 |
| WO | 01/41419 A1 | 6/2001 |
| WO | 2007/029123 A2 | 3/2007 |
| WO | 2007/114826 A1 | 10/2007 |
| WO | 2008/005018 A2 | 1/2008 |
| WO | 2008/027620 A1 | 3/2008 |
| WO | 2009/051937 A1 | 4/2009 |
| WO | 2010/033970 A1 | 3/2010 |
| WO | 2010/141268 A1 | 12/2010 |
| WO | 2012/142315 A2 | 10/2012 |

* cited by examiner

MESSAGE ROUTING USING LOGICALLY INDEPENDENT RECIPIENT IDENTIFIERS

CROSS-REFERENCE TO RELATED APPLICATIONS

The present non-provisional application is a continuation of and claims the benefit under 35 U.S.C. §120 of U.S. patent application Ser. No. 13/445,357, filed on Apr. 12, 2012, and entitled "Message Routing Using Logically Independent Recipient Identifiers," which claims benefit under 35 U.S.C. §119(e) of U.S. Provisional Application No. 61/475,135, filed on Apr. 13, 2011, entitled "Push Payment Transactions to Mobile Number", both of which are herein incorporated by reference in their entirety for all purposes.

BACKGROUND

Since their commercial introduction to the United States in the 1920's, consumer use of payment cards, such as credit cards, debit cards, and the like, for facilitating financial transactions in many western societies has grown rapidly. For example, as of 2010, there are an estimated 1.6 billion credit cards in use in the United States alone.

While payment card use has been widely adopted in some countries, not everybody has or uses payment cards. For example, credit card use is very limited in developing countries. For another example, even in developed countries, people may not use credit cards due to security concerns or credit problems. However, with the increasing availability and use of mobile telephones, especially in developing countries where credit card use is limited, people without credit cards often have a mobile telephone. Like credit card users, people with mobile telephones would like the advantages of performing financial transactions without the hand-to-hand exchange of actual currency.

There are numerous ways in which one person may transfer money to another person. For example, the sender may directly deposit funds into a bank account of the recipient, or may electronically transfer funds to a bank account of the recipient. However, these techniques typically require the sender to have knowledge of personal or financial information of the recipient, and fail to exploit the proliferance of and increasing computational power of mobile telephones.

Further, mobile telephone operators, such as Verizon Communications Inc. and AT&T Inc., have the infrastructure for facilitating telephone calls between land and mobile telephones. However, they typically do not have the infrastructure for performing the mechanics underlying many financial transactions, an infrastructure which is often provided by payment processing networks such as those provided by Visa, Inc. and Mastercard, Inc. It is thus desirable to integrate the mobile telephone systems with the payment processing networks. This integration is challenging, however, since payment processing networks are structured to operate using a 16-digit primary account number (PAN) where the first 6 digits identify an issuer of the card and the entire 16-digit PAN identifies an account associated with the customer, whereas mobile telephone networks are structured to operate using a 10-digit telephone number.

Embodiments of this disclosure address these and other problems, individually and collectively.

BRIEF SUMMARY

Embodiments of the invention disclosed herein include systems and methods for routing messages using logically independent recipient identifiers.

One embodiment of the invention is directed to a method comprising: receiving, from a sending institution, an authorization request message at a server computer, the authorization request message comprising a non-financial institution identifier and a recipient identifier separate from the non-financial institution identifier, the non-financial institution identifier identifying a non-financial institution, the recipient identifier being associated with a recipient, wherein the authorization request message requests authorization for a transaction between a sender and the recipient; determining, by the server computer, the non-financial institution from a number of different non-financial institutions; routing the authorization request message to the non-financial institution; and receiving, from the non-financial institution and at the server computer, an authorization response message, the authorization response message indicating whether or not the transaction is approved.

Another embodiment of the invention is directed to a server computer comprising: a processor; and a storage element having instructions stored therein that, when executed by the processor, cause the server to perform operations including: receiving, from a sending institution, an authorization request message, the authorization request message comprising a non-financial institution identifier and a recipient identifier separate from the non-financial institution identifier, the non-financial institution identifier identifying a non-financial institution, the recipient identifier being associated with a recipient, wherein the authorization request message requests authorization for a transaction between a sender and the recipient; determining the non-financial institution from a number of different non-financial institutions; routing the authorization request message to the non-financial institution; and receiving, from the non-financial institution, an authorization response message, the authorization response message indicating whether or not the transaction is approved.

Another embodiment of the invention is directed to a method comprising: receiving, at a sending institution server, from a sender requesting authorization for a transaction between the sender and a recipient, a recipient identifier associated with the recipient; determining whether the recipient identifier is enrolled so that the recipient can receive transactions; when the recipient identifier is determined to be enrolled, receiving, from an entity other than the sender, a non-financial institution identifier identifying a non-financial institution; generating an authorization request message comprising the recipient identifier and the non-financial institution identifier separate from the recipient identifier; and sending the authorization request message to authorize the transaction between the sender and a recipient.

Another embodiment of the invention is directed to a server computer comprising: a processor; and a storage element having instructions stored therein that, when executed by the processor, cause the server to perform operations including: receiving, from a sender requesting authorization for a transaction between the sender and a recipient, a recipient identifier associated with the recipient; determining whether the recipient identifier is enrolled so that the recipient can receive transactions; when the recipient identifier is determined to be enrolled, receiving, from an entity other than the sender, a non-financial institution identifier identifying a non-financial institution; generating an authorization request message comprising the recipient identifier and the non-financial institution identifier separate from the recipient identifier; and sending the authorization request message to authorize the transaction between the sender and a recipient.

Another embodiment of the invention is directed to a method comprising: receiving, from a payment processing network, a check enrollment message at a server computer, the check enrollment message being directed to a recipient telephone number; determining whether the recipient telephone number is enrolled to receive financial transactions; and sending a response message from the server computer to the payment processing network indicating whether the recipient telephone is enrolled to receive financial transactions.

Another embodiment of the invention is directed to a server computer comprising: a processor; and a storage element having instructions stored therein that, when executed by the processor, cause the server to perform operations including: receiving, from a payment processing network, a check enrollment message at a server computer, the check enrollment message being directed to a recipient telephone number; determining whether the recipient telephone number is enrolled to receive financial transactions; and sending a response message from the server computer to the payment processing network indicating whether the recipient telephone is enrolled to receive financial transactions.

These and other embodiments of the invention are described in further detail below.

DETAILED DESCRIPTION

Figure 1:
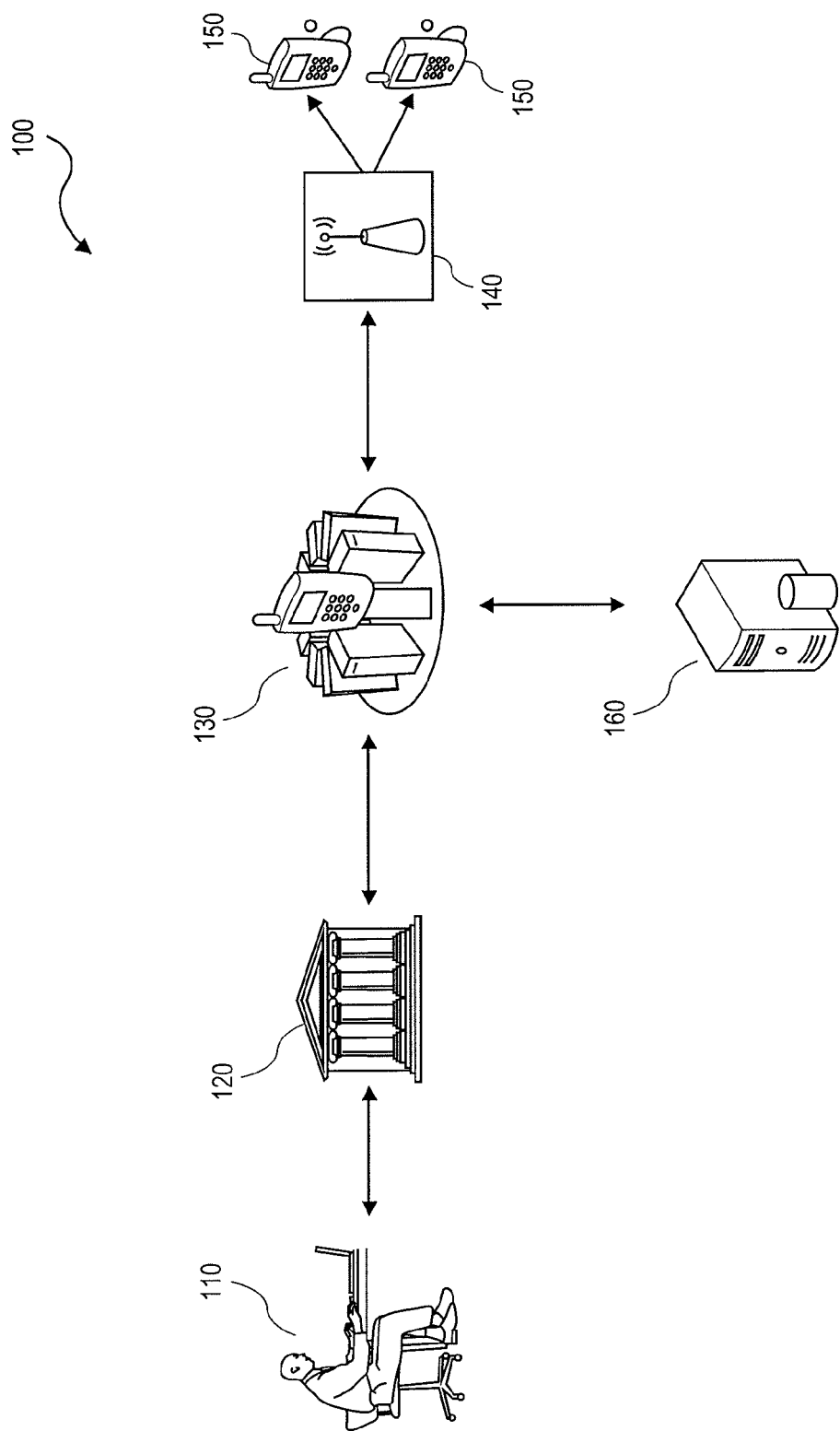
FIG. 1 shows a diagram of a system according to an embodiment of the invention.

The following disclosure provides exemplary systems and methods for routing messages using logically independent recipient identifiers such as telephone numbers.

Various embodiments described herein may generally include two different processes. In the first process, the system determines whether a recipient is enrolled such that the recipient may receive financial transactions via a recipient identifier. In the second process, which is performed in the event the recipient is enrolled, the system facilitates posting of the transaction.

Various embodiments are described for performing the first process. In some embodiments, enrollment may be determined using SMS messaging between a payment processing network and a mobile network operator. In accordance with these embodiments, a sending customer provides a recipient identifier, such as the recipient's mobile telephone number, to a sending institution (e.g., a bank) and initiates a transaction (e.g., indicating an amount of money to be transferred to the recipient). The sending institution sends a check enrollment message to a payment processing network, where the check enrollment message includes the recipient identifier. The payment processing network initiates an short message service (SMS) message using, e.g., the recipient's mobile telephone number, to the mobile network operator in a pre-defined format. The SMS message gets routed to the correct mobile network operator as per the standard routing logic used over the mobile network operators.

On receiving the SMS message, the mobile network operator checks the enrollment status of the recipient identifier and sends a response message to a mobile gateway hosted by the payment processing network. The response could indicate that the recipient is enrolled, in which case the SMS message confirms enrollment and includes a bank identification number (BIN) uniquely assigned to the mobile network operator. Or the response could indicate that the recipient is not enrolled, in which case the requested transaction may not be completed. In either case, the SMS message received by the mobile network operator is not forwarded to the recipient mobile communication device.

Based on the SMS response message, the payment processing network notifies the sending institution on the status of the recipients enrollment. If it is an un-enrolled recipient, the sending institution may notify the sending customer of such a status. For enrolled recipients, the sending institution creates and submits a standard ISO 8583 message to the payment processing network. However, the message has the recipient identifier in place of the primary account number (PAN) and the BIN assigned to the mobile network operator in a field separate from the recipient identifier. The payment processing network forwards the transaction to the mobile network operator, after which the mobile network operator posts the transaction in a digital wallet linked to the recipient identifier and sends a response message to the payment processing network. The payment processing network forwards the response to the sending institution which may then provide a confirmation of transfer to the sending customer.

In other embodiments, enrollment may be determined using a call switching entity. A call switching entity is a computer network that facilitates the routing of telephone calls between users of different telephone networks. The call switching entity includes records of telephone numbers and the mobile network operator that hosts or is otherwise associated with each telephone number. The call switching entity is thus in a unique position to identify mobile network operator associated with a recipient's mobile telephone number. The enrollment processing for these embodiments is similar to that already described with reference to SMS messaging. However, in these embodiments, instead of sending an SMS message to the mobile network operator, the payment processing network sends a request to the call switching entity for the identity of the mobile network operator associated with the recipient's telephone number. The call switching entity may identify the mobile network operator associated with the recipient's telephone number and send the mobile network operator identifier to the payment processing network. In response, the payment processing network then checks whether the recipient telephone number is enrolled to receive financial transactions.

Before discussing specific embodiments of the invention, some descriptions of some specific terms are provided below.

A "sending institution" may be any entity with the capability to initiate a transaction, e.g., a bank, a money transfer facility like MoneyGram®, or any other entity authorized to transfer value.

A "non-financial institution" may be a device, system, network, or entity that facilitates communication between different electronic communication devices. For example, a non-financial institution may be a mobile network operator operable to facilitate wireless communication between mobile telephones.

A "non-financial institution identifier" may be an identifier that uniquely identifies different non-financial institutions. For example, the non-financial institution identifier may be a data string containing alphanumeric text, a sequence of binary bits, etc.

A "recipient identifier" may be an identifier that uniquely identifies a recipient of a transaction. The recipient identifier may be issued by a government, a corporation, or by some other type of entity. The recipient identifier may be, e.g., a mobile communication device identifier, a driver's license number, a social security number, a passport number, a national identification number, an e-mail address, a name used in instant messaging applications, social networking applications, or other types of software applications, etc.

A "mobile communication device identifier" may be an identifier that uniquely identifies a mobile communication device. For example, a mobile communication device identifier may be a phone number, an IP address, a MAC address, etc.

A "sender" or "sending customer" may be a person, business, or other entity that desires to initiate a transaction, such as a financial payment, to a recipient.

A "recipient" may be a person, business, or other entity that receives a transaction, such as a financial payment, from a sender or sending customer.

A "transaction request" may be a request by a sender to perform a transaction, such as a financial transaction or other transfer of value, with a recipient. The transaction request may be a request to transfer funds from an account associated with the sender to an account associated with the recipient. The transaction request may include various information, such as account information of the sender, and/or account information of the recipient. The account information of the recipient may include a mobile communication device identifier (e.g., a mobile telephone number) associated with the recipient.

A "transaction response" may be an electronic message reply to a transaction request, which may include one or more of the following status indicators: Approval—transaction was approved; Decline—transaction was not approved; or Call Center—response pending more information, sender or recipient must call a toll-free authorization phone number.

An "authorization request message" may be a message that requests an issuer of an account associated with a recipient to authorize a transaction requested by a sender. The authorization request message may include a recipient mobile communication device identifier (e.g., a mobile telephone number associated with the recipient) and a mobile network operator identifier (i.e., an identifier that uniquely identifies the mobile network operator on which the mobile communication device associated with the recipient operates). The authorization request message may also include other information, such as transaction information and account information for the sender and/or recipient. An authorization request message according to an embodiment of the invention may comply with ISO 8583, which is a standard for systems that exchange electronic transactions made by cardholders using payment cards. An authorization request message may comprise data elements including, in addition to the recipient mobile communication device identifier, a service code, a CVV (card verification value), and an expiration date.

An "authorization response message" may be an issuing financial institution's electronic message reply to an authorization request, which may include one or more of the following status indicators: Approval—transaction was approved; Decline—transaction was not approved; or Call Center—response pending more information, sender or recipient must call the toll-free authorization phone number. It may also include an authorization code that serves as proof of authorization.

"Account information" may include any suitable information associated with a financial account. Such information may be directly related to the account or may be derived from information related to the account. Examples of account information include a PAN (primary account number), name, expiration date, CVV (card verification value), dCVV (dynamic card verification value), CVV2 (card verification value 2), dCVV2 (dynamic card verification value 2), a bank identification number (BIN), account balance information, expiration date, consumer information such as name, date of birth, etc. CVV2 is generally understood to be a static verification value associated with a portable payment device. dCVV2 is a dynamic verification value associated with a portable payment device. dCVV2 and CVV2 values are generally visible to a user (e.g., a consumer), whereas CVV and dCVV values are typically embedded in memory or the authorization request message and are not readily known to the user (although they are known to the issuer and payment processors).

"Transaction information" may include a variety of information regarding a financial transaction (or other transfer of value) between a sending customer and a recipient. For example, transaction information may include a telephone number of the desired recipient, an amount of money to be transferred, a sender's account information, a recipient name, a recipient address, etc.

"Sender account information" (a) may include a variety of information regarding a financial account provided by a sending institution for a sending customer. For example, sender account information may include a sender's name, a sender's account number, a sender's contact information, a PAN, an expiration date, a CVV, dCVV, DVV2, dVV2, etc.

"Separate from", in the context of a recipient identifier being "separate from" a non-financial institution identifier, means that at least one component of the non-financial institution identifier is not used to define the recipient identifier. For example, each of the recipient identifier and the non-financial institution identifier may be strings of alphanumeric characters, binary numbers, etc. While some of the characters of the non-financial institution may be used as characters of the recipient identifier, not all of the characters of the non-financial institution may be used as characters of the recipient identifier. In some cases, the recipient identifier may be entirely separate from the non-financial institution identifier, in which case none of the characters of the non-financial institution identifier may be used as characters of the recipient identifier.

"Logically independent" is used synonymously with "separate from".

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

Specific details regarding some of the above-described aspects are provided below. The specific details of the specific aspects may be combined in any suitable manner without departing from the spirit and scope of embodiments of the invention.

Certain embodiments of the invention may provide one or more advantages to mobile network operators, card associations, sending and receiving customers, and others.

Advantages to mobile telephone networks include one or more of: they may participate with established networks of financial institutions over the card-networks; mobile numbers may continue to be used as the key identifiers to mobile wallets—even when used for financial transactions over card-networks; a simple integration path into the established card-association financial networks is provided; and the embodiments are more efficient and scalable than bilateral agreements in use today.

Advantages to card associations include one or more of: a scalable solution for integration with mobile networks; a simplified customer experience that should result in high adoption and stickiness; and product differentiation vis-à-vis competition networks.

Advantages to sending customers include one or more of: ease of sending a financial transaction to an account associated with a mobile telephone number; no requirement to carry any information to help identify the mobile operator (e.g., an issuer identifier).

As discussed herein, some embodiments involve using a standard text 'SMS' to validate enrollment. This approach has one or more of the following advantages: eliminates the need for managing a database of enrolled mobile wallets at the payment processing network; gets the most current enrollment status from the mobile telephone network; and ensures identification of the correct mobile telephone network for the recipient mobile number—this cannot be done based on the mobile number, especially with mobile number portability.

Certain embodiments of the invention may include none, some, or all of the above technical advantages. One or more other technical advantages may be readily apparent to one skilled in the art from the figures, descriptions, and claims included herein.

I. Exemplary Systems

FIG. 1 illustrates a system 100 used for enabling message routing using logically independent recipient identifiers, according to one embodiment of the invention. System 100 includes sending customer 110, sending institution 120, payment processing network 130, mobile network operator 140, recipient mobile communication device 150, and call switching entity 160. Referring to FIG. 1, it is understood, however, that embodiments of the invention may include more than one of each of these components. In addition, some embodiments of the invention may include fewer than all of the components shown in FIG. 1. Also, the components of FIG. 1 may communicate via any suitable communication medium (including the Internet) using any suitable communication protocol.

Sending customer 110 may be a person, business, or other entity that desires to initiate a transaction, such as a financial payment, to a recipient associated with a recipient mobile communication device 150. In some embodiments, sending customer 110 may use a computing device, such as a desktop computer, laptop computer, mobile telephone, etc. to initiate the transaction, while in other embodiments sending customer 110 may initiate the transaction by visiting sending institution 120 in person, calling sending institution 120, or through some other communication means.

In embodiments where sending customer 110 uses a computing device, the computing device can be portable or desk-mounted. Some examples of possible computing devices include laptop computers, cellular phones, personal digital assistants (PDAs), and the like.

Sending customer 110 may communicate with sending institution 120 via any suitable mechanism. In some embodiments, where sending customer 110 is a person, sending customer 110 may communicate with sending institution 120 via verbal or other communication means. In other embodiments, where sending customer 110 uses a computing device, the computing device may communicate with sending institution 120 over a wired or wireless network, such as the Internet. In some embodiments, the computing device used by sending customer 110 includes a software application operable to communicate with sending institution 120 via an application programming interface (API) provided by sending institution 120. In other embodiments, the computing device used by sending customer 110 includes a web browser application operable to access a website hosted by sending institution 120.

Figure 2:
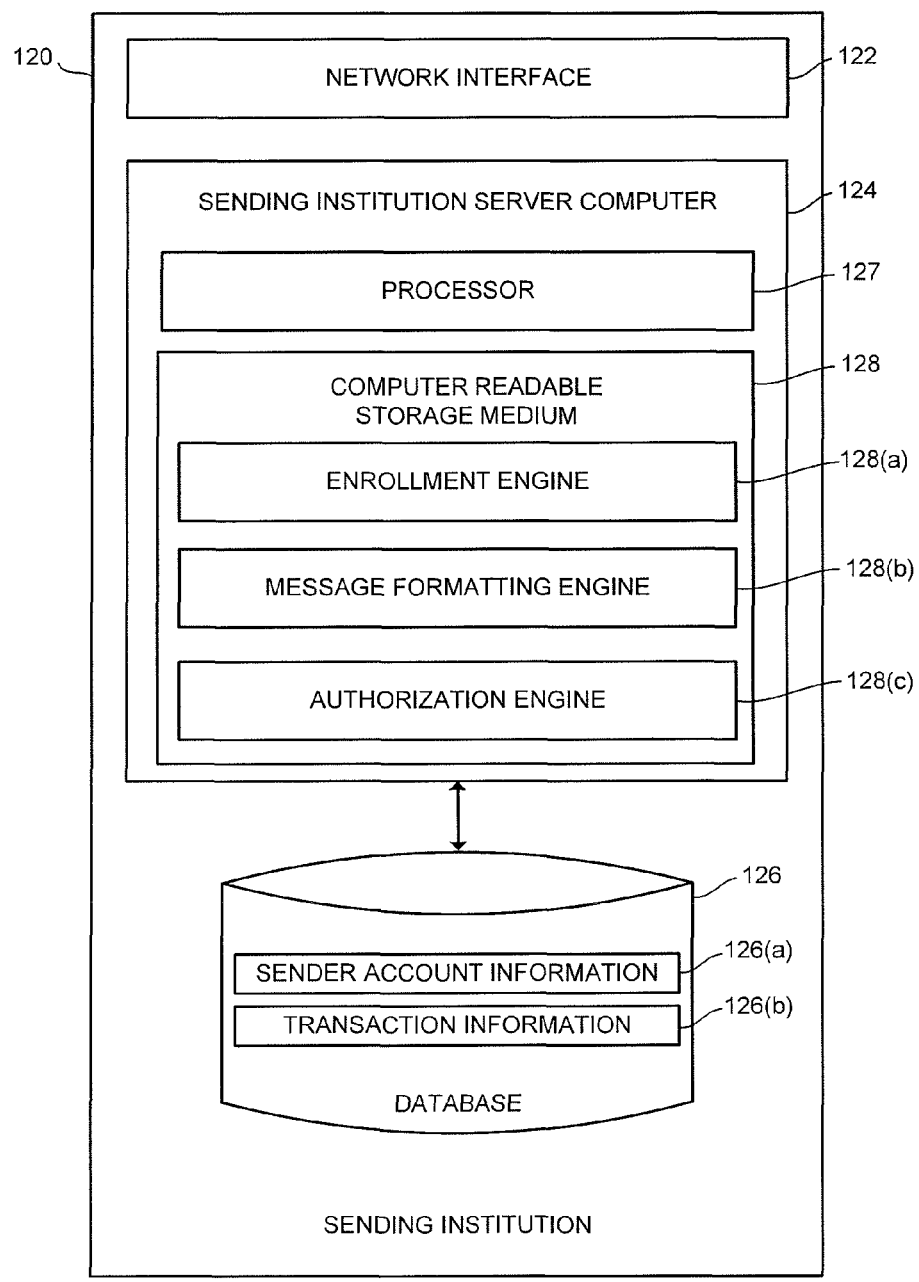
FIG. 2 shows a block diagram of some components of a sending institution according to an embodiment of the invention.

Sending institution 120 can be any entity with the capability to initiate a transaction, e.g., a bank, a money transfer facility like MoneyGram®, or any other entity authorized to transfer value. Turning briefly to FIG. 2, FIG. 2 shows a block diagram of some components of a sending institution 120 according to an embodiment of the invention. Sending institution 120 may include a network interface 122, a sending institution server computer 124, and a database 126, all operatively coupled to one another.

The network interface 122 may operate to facilitate wired or wireless communication between sending institution 120 and other elements of system 100, such as a sending customer 110 computing device and a payment processing network 130. The server computer 124 may include a processor 127 and a tangible non-transitory computer readable storage medium 128, where processor 127 is operable to execute instructions or code stored in storage medium 128. Storage medium 128 may include a variety of software engines such as an enrollment engine 128(a), a message formatting engine 128(b), and an authorization engine 128(c).

The enrollment engine 128(a) may include code for facilitating the determination of whether a recipient phone number is enrolled to receive financial transactions. The message formatting engine 128(b) may include code for generating and formatting messages, such as a check enrollment message and a transaction authorization request message. The authorization engine 128(c) may include code for facilitating the authorization of a transaction request. Further details of these engines and other functions that these engines may be operable to perform are further described herein. It should be recognized that in some embodiments the functions performed by these engines may be implemented in hardware rather than software.

The database 126 refers to any hardware, software, firmware, or combination of the preceding for storing and facilitating retrieval of information. The database may use any of a variety of data structures, arrangements, and compilations to store and facilitate retrieval of information. Database 126 may store a variety of information, such as sender account information 126(a) and transaction information 126(b). Sender account information 126(a) may include a variety of information regarding a financial account provided by sending institution 120 for the sending customer 110. For example, account information may include a PAN, name, expiration date, CVV, dCVV, DVV2, dVV2, etc. Transaction information 126(b) may include a variety of information regarding a financial transaction (or other transfer of value) between sending customer 110 and a recipient. For example, transaction information 126(b) may include a recipient identifier for the desired recipient, an amount of money to be transferred, a sender's name, a sender's contact information, a sender's account information, a recipient name, a recipient address, etc.

Sending institution 120 may facilitate various types of payment transactions, e.g., On-Us or Off-Us. An On-Us transaction is one in which the sending customer has an account at the sending institution where the transfer is originated. For example, a sending customer has a payment device (e.g., a credit card) issued by Citibank and the sending customer initiates a money transfer transaction using that payment device at a Citibank branch or a Citibank ATM. In contrast, an Off-Us transaction is one in which the sending customer does not have any account at the sending institution where the transfer is originated.

Figure 3:
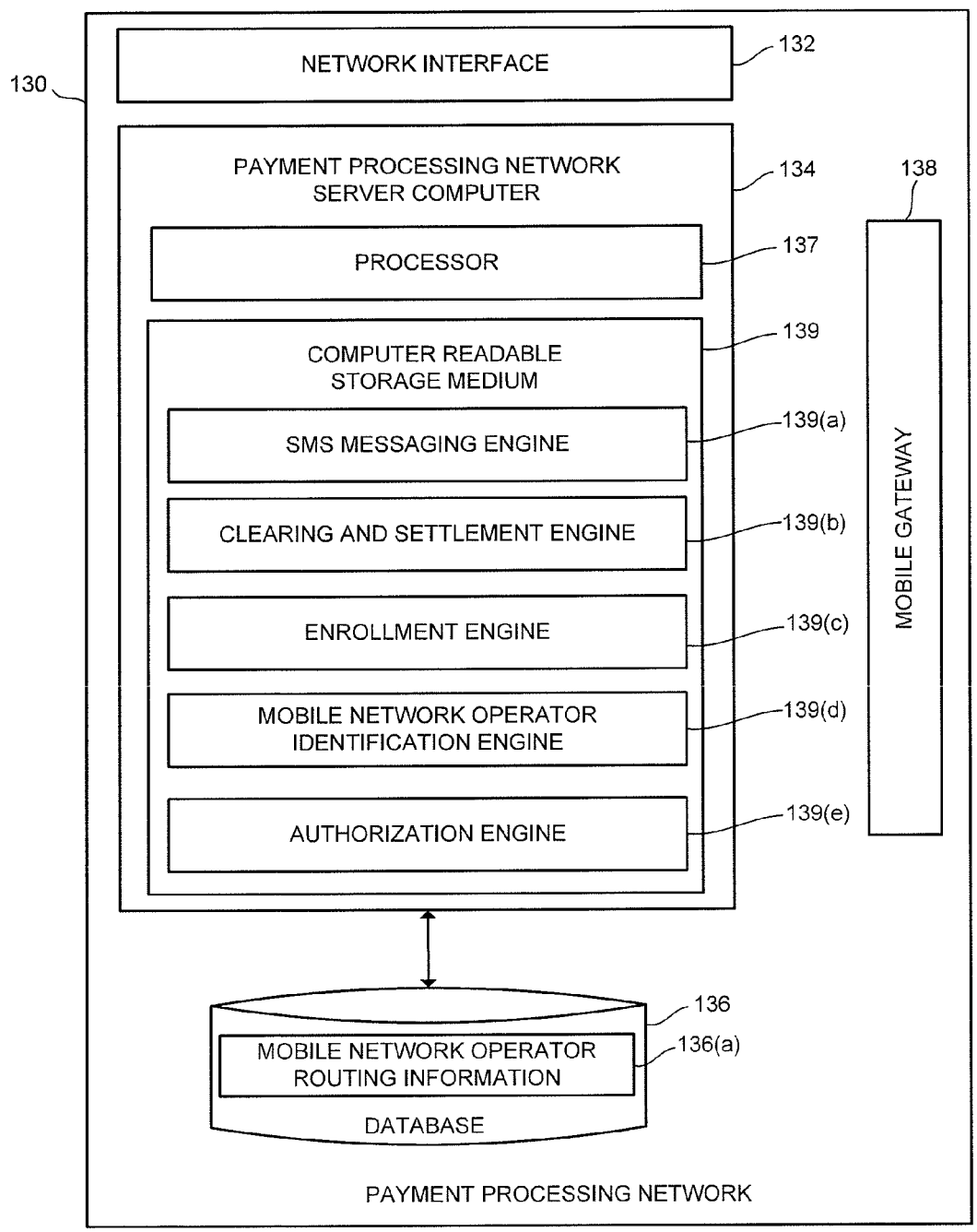
FIG. 3 shows a block diagram of some components of a payment processing network according to an embodiment of the invention.

Payment processing network 130 refers to a network of suitable entities for processing and communicating enrollment and transaction information on behalf of sending customer 110. Turning briefly to FIG. 3, FIG. 3 shows a block diagram of some components of a payment processing network according to an embodiment of the invention. Payment processing network 130 may include a network interface 132, a payment processing network server computer 134, a database 136, and a mobile gateway 138, all operatively coupled to one another.

The network interface 132 may operate to facilitate wired or wireless communication between payment processing network 130 and other elements of system 100, such as sending institution 120, a mobile network operator 140, and a call switching entity 160. The server computer 134 may include a processor 137 and a tangible non-transitory computer readable storage medium 139, where processor 137 is operable to execute instructions or code stored in storage medium 139. Storage medium 139 may include a variety of software engines such as an SMS messaging engine 139(a), a clearing and settlement engine 139(b), an enrollment engine 139(c), a mobile network operator identification engine 139(d), and an authorization engine 139(e).

The SMS messaging engine 139(a) may include code for sending and receiving SMS messages through the mobile gateway 138 to mobile network operator 140. The clearing and settlement engine 139(b) may include code for performing transaction clearing and settlement functions between various acquirers and issuers. The enrollment engine 139(c) may include code for facilitating the determination of whether a recipient phone number is enrolled to receive financial transactions. The mobile network operator identification engine 139(d) may include code for identifying a mobile network operator. The authorization engine 139(e) may include code for facilitating the authorization of a transaction request. Further details of these engines and other functions that these engines may be operable to perform are further described herein. It should be recognized that in some embodiments the functions performed by these engines may be implemented in hardware rather than software.

The database 136 refers to any hardware, software, firmware, or combination of the preceding for storing and facilitating retrieval of information. The database may use any of a variety of data structures, arrangements, and compilations to store and facilitate retrieval of information. Database 136 may store a variety of information, such as a mobile network operator routing table 136(a). Mobile network operator routing table 136(a) may include a variety of information for routing messages from payment processing network 130 to a select mobile network operator 140 via network interface 132. For example, mobile network operating routing table 136(a) may include routes to internet protocol (IP) addresses or other network destinations for each of a number of different mobile network operators.

The mobile gateway 138 is a server, system, or network that operates to communicate information from server computer 134 over a wireless network such as one provided by mobile network operator 140. Mobile gateway 138 may, for example, facilitate the communication of SMS messages between server computer 134 and mobile network operator 140.

According to some embodiments, payment processing network 130 may include data processing subsystems, networks, and operations used to support and deliver authorization services, exception file services, and clearing and settlement services. An exemplary payment processing network 130 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services.

Figure 4:
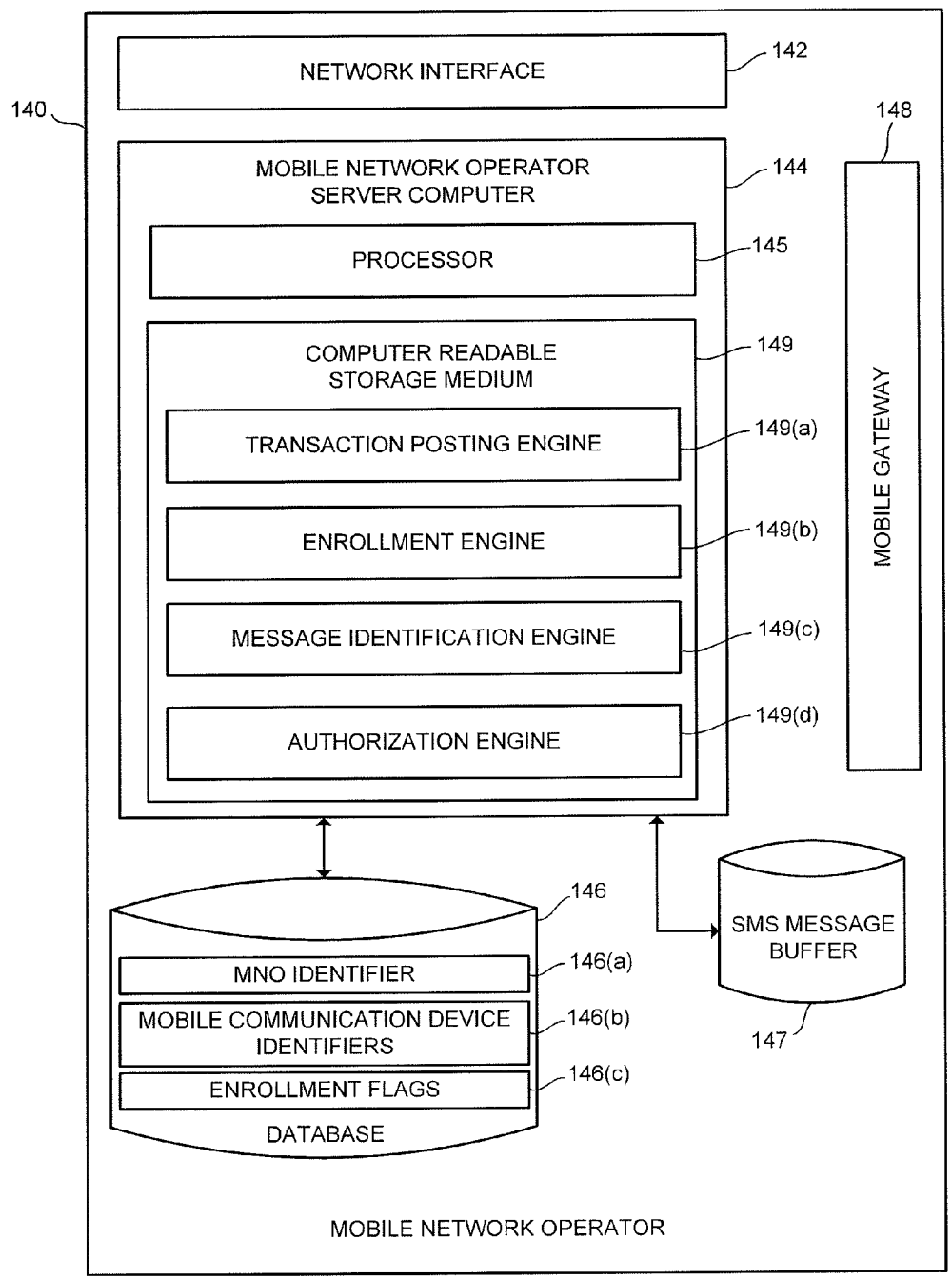
FIG. 4 shows a block diagram of some components of a mobile network operator according to an embodiment of the invention.

Mobile network operator 140 refers to a network of devices for providing wireless communication services to subscribers of the communication services. For example, mobile network operator 140 may facilitate wireless communication between different mobile communication devices 150. Turning briefly to FIG. 4, FIG. 4 shows a block diagram of some components of a mobile network operator according to an embodiment of the invention. Mobile network operator 140 may include a network interface 142, a mobile network operator server computer 144, a database 146, an SMS message buffer 147, and a mobile gateway 148, all operatively coupled to one another. In some embodiments, mobile network operator 140 may be a non-financial institution, where the non-financial institution is any device, system, network or entity that facilitates communication between different electronic communication devices. Accordingly, the non-financial institution may include components such as network interface 142, server computer 144, database 146, SMS message buffer 147, and mobile gateway 148.

The network interface 142 may operate to facilitate wired or wireless communication between mobile network operator 140 and other elements of system 100, such as payment processing network 130. The server computer 144 may include a processor 145 and a tangible non-transitory computer readable storage medium 149, where processor 145 is operable to execute instructions or code stored in storage medium 149. Storage medium 149 may include a variety of software engines such as a transaction posting engine 149(a), an enrollment engine 149(b), a message identification engine 149(c), and an authorization engine 149(d).

The transaction posting engine 149(a) may include code for posting financial transactions to a mobile wallet or other account associated with a recipient. The enrollment engine 149(b) may include code for determining whether a recipient identifier, such as a recipient phone number, is enrolled to receive financial transactions. The message identification engine 149(c) may include code for determining whether an SMS message should be forwarded to a mobile communication device. The authorization engine 149(d) may include code for facilitating the authorization of a transaction request. Further details of these engines and other functions that these engines may be operable to perform are further described herein. It should be recognized that in some embodiments the functions performed by these engines may be implemented in hardware rather than software.

The database 146 refers to any hardware, software, firmware, or combination of the preceding for storing and facilitating retrieval of information. The database may use any of a variety of data structures, arrangements, and compilations to store and facilitate retrieval of information. Database 146 may store a variety of information, such as a mobile network operator (MNO) identifier 146(a), mobile communication device identifiers 146(b) (or other type of recipient identifier), and enrollment flags 146(c). The mobile network operator identifier 146(a) may be an identifier that uniquely identifies mobile network operator 140. For example, mobile network operator identifier 146(a) may be a BIN issued by payment processing network 130. In some embodiments, the mobile network operator identifier 146(a) may be a non-financial institution identifier, where the non-financial institution identifier uniquely identifies mobile network operator 140 or other types of institutions that do not directly provide financial services. The mobile communication device identifiers 146(b) may be identifiers that uniquely identify different mobile communication devices 150 which are operable to communicate with one another via mobile network operator 140. For example, mobile communication device identifiers 146(b) may be phone numbers, IP addresses, MAC addresses, etc. Enrollment flags 146(c) may each be associated with a mobile communication device identifier 146(b) and may indicate whether the associated mobile communication device is enrolled to receive financial transactions. In some cases, other types of recipient identifiers may be stored in place of mobile communication device identifiers 146(b). Such identifiers may be government issued, issued by a corporation, or issued by another type of entity. The recipient identifier may be, e.g., a mobile communication device identifier, a driver's license number, a social security number, a passport number, a national identification number, an e-mail address, a name used in instant messaging applications, social networking applications, or other types of software applications, etc.

SMS message buffer 147 refers to any hardware, software, firmware, or combination of the preceding for storing and facilitating retrieval of SMS messages. The buffer may use any of a variety of data structures, arrangements, and compilations to store and facilitate retrieval of SMS messages.

The mobile gateway 148 is a server, system, or network that operates to communicate information from server computer 144 over a wireless network such as one provided by mobile network operator 140. Mobile gateway 148 may, for example, facilitate the communication of SMS messages between server computer 144 and payment processing network 130. Mobile gateway 148 may also, for example, facilitate the communication of messages between server computer 144 and mobile communication devices 150.

Figure 5:
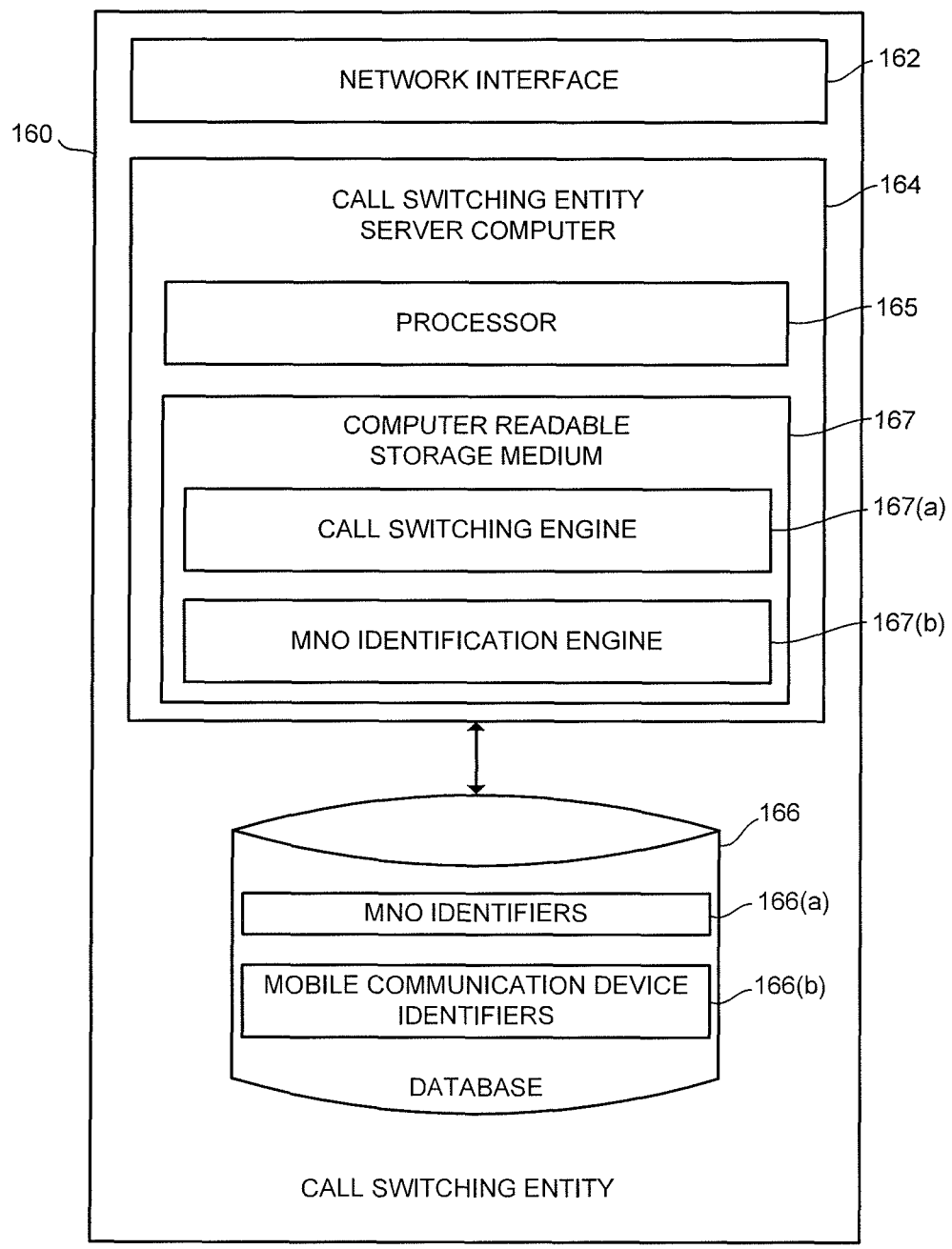
FIG. 5 shows a block diagram of some components of a call switching entity according to an embodiment of the invention.

Call switching entity 160 refers to a network of devices for routing telephone calls between users of different telephone networks. For example, call switching entity 160 may facilitate a telephone call between different mobile communication devices 150 where the mobile communication devices 150 each operate over a different mobile network provider 140. Turning briefly to FIG. 5, FIG. 5 shows a block diagram of some components of a call switching entity according to an embodiment of the invention. Call switching entity 160 may include a network interface 162, a call switching entity server computer 164, and a database 166, all operatively coupled to one another.

The network interface 162 may operate to facilitate wired or wireless communication between call switching entity 160 and other elements of system 100, such as payment processing network 130. The server computer 164 may include a processor 165 and a tangible non-transitory computer readable storage medium 167, where processor 165 is operable to execute instructions or code stored in storage medium 167. Storage medium 167 may include a variety of software engines such as a call switching engine 167(a) and a mobile network operator identification engine 167(b).

The call switching engine 167(a) may include code for routing telephone calls between mobile communication devices operating on different mobile network operators, either in the same or in different countries. The mobile network operator identification engine 167(b) may operate to identify a mobile network operator on which a particular mobile communication device operates.

The database 166 refers to any hardware, software, firmware, or combination of the preceding for storing and facilitating retrieval of information. The database may use any of a variety of data structures, arrangements, and compilations to store and facilitate retrieval of information. Database 166 may store a variety of information, such as mobile network operator identifiers 166(a) and mobile communication device identifiers 166(b) (or other types of recipient identifiers). The mobile network operator identifiers 1466(a) may each be an identifier that identifies a unique mobile network operator. For example, mobile network operator identifiers 166(a) may each be a BIN issued by payment processing network 130. For another example, mobile network operator identifiers 166(a) may each be unique data strings assigned by an entity other than a payment processing network. In some embodiments, the mobile network operator identifiers 166(a) may be non-financial institution identifiers. The mobile communication device identifiers 166(b) may be identifiers that uniquely identify different mobile communication devices 140. For example, mobile communication device identifiers 166(b) may be phone numbers, IP addresses, MAC addresses, etc. In some cases, other types of recipient identifiers as previously described herein may be stored in place of mobile communication device identifiers 146(b).

Figure 6:
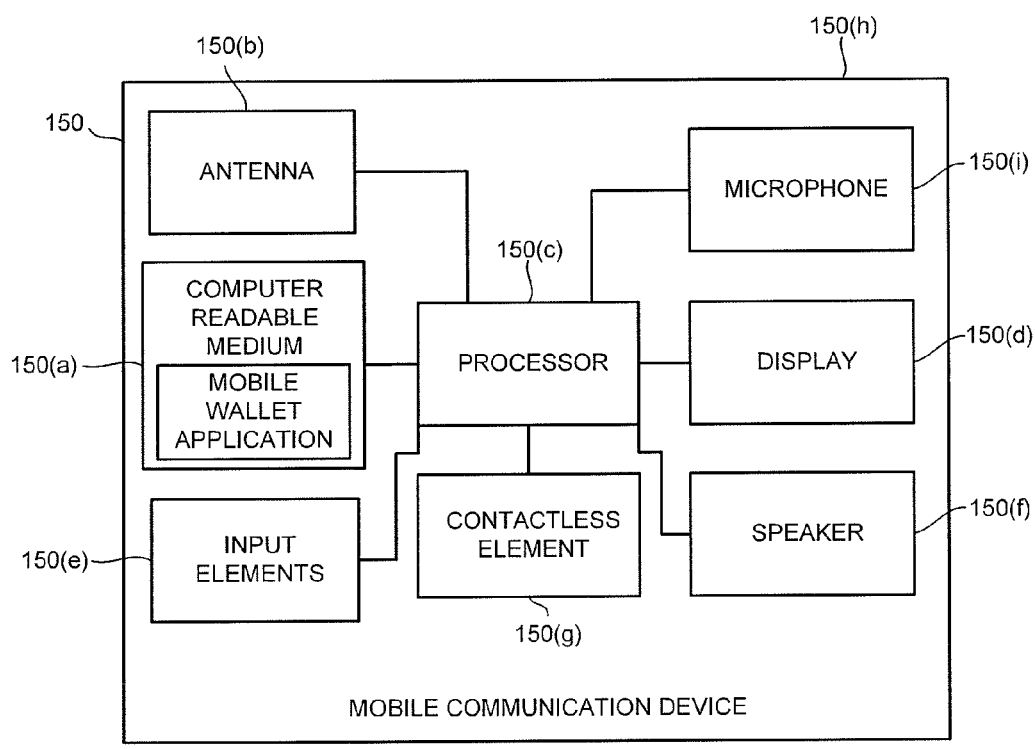
FIG. 6 shows a block diagram of some components of a mobile communication device according to an embodiment of the invention.

Mobile communication devices 150 may be any portable electronic computing device operable to wirelessly communicate with other mobile communication devices via mobile network operator 140. Turning briefly to FIG. 6, FIG. 6 shows a block diagram of some components of a mobile communication device 150 according to an embodiment of the invention. The mobile communication device 150 can be both a notification device that can display messages to a user, as well as a portable device that can be used to receive payments. The exemplary mobile communication device 150 may comprise a computer readable medium and a body as shown in FIG. 6. The computer readable medium 150(a) may be present within the body 150(*h*), or may be detachable from it. The body 150(*h*) may be in the form a plastic substrate, housing, or other structure. The computer readable medium 150(*a*) may be in the form of (or may be included in) a memory that stores data (e.g., code for a mobile wallet application) and may be in any suitable form including a memory chip, etc. The computer readable medium 150(*a*) preferably stores information associated with the mobile wallet application, such as account information of a user of the mobile communication device 150.

In some embodiments, the mobile wallet application may be an electronic wallet that can be used to conduct a transaction. A mobile wallet application may be used in a variety of transactions, including but not limited to eCommerce, social networks, money transfer/personal payments, mobile commerce, proximity payments, gaming, and/or the like. For example, consumers such as the sending customer 110 may engage in eCommerce via the mobile wallet application for retail purchases, digital goods purchases, and utility payments via, e.g., a mobile communication device identifier associated with the recipient of the transaction. Consumers may also, for example, use the mobile wallet application to purchase games or gaming credits from gaming websites, and transfer funds to friends via social networks. Further, for example, consumers may also use the mobile wallet application on a smart phone (such as mobile communication device 150) for retail purchases, buying digital goods, NFC/RF payments at point of sale (POS) terminals.

In an exemplary transaction involving an mobile wallet application, a consumer may submit an indication to purchase or transfer funds. For example, the consumer may visit a merchant website (e.g., Facebook.com, Amazon.com, etc.), and request to purchase an item from the website, transfer funds to a friend, and/or the like. The merchant website may determine whether the electronic wallet is authorized on its website, and may provide a list of payment options. If the merchant is registered with an electronic wallet server, the electronic wallet server may authorize the merchant to collect consumer credentials for login to the electronic wallet, and the merchant website may prompt the consumer to login to the electronic wallet. Otherwise, the merchant website may request the consumer to provide payment details for alternative payment options (e.g., credit card, debit card, PayPal account).

The consumer may authorize submission of their wallet consumer credentials, such as, but not limited to a Wallet/Consumer ID, a password, and/or the like. For example, the consumer may enter the Wallet/Consumer ID and password into a pop-up window provided from the merchant website and/or electronic wallet server. In another example, the consumer may authorize the merchant website to provide the consumer credentials (e.g., previously stored in HTML5, cookies, etc.), to the electronic wallet server. In yet another example, the consumer may authorize the electronic wallet server, via a remote component running on the merchant website (e.g., a Java applet, etc.) to provide consumer credentials to the electronic wallet server for validation.

When the consumer submits consumer credentials to log into the electronic wallet, the merchant website may forward the consumer credentials and transaction details to the electronic wallet server, which may determine the validity of the consumer credentials. If the consumer's credentials are not valid, the electronic wallet server may deny the payment request and send a notification of denial to the merchant website. In other embodiments, if the consumer provided credentials are valid, the electronic wallet server may process payment from the electronic wallet. For example, the electronic wallet server communicates with the consumer's bank account associated with the electronic wallet and requests a fund transfer of an indicated amount. The electronic wallet server may then store a transaction record.

In some embodiments, after processing the payment, the electronic wallet server sends a payment confirmation notice to the merchant website, which in turn completes the order and stores the transaction record in the database. The merchant website may provide a confirmation page comprising transaction confirmation to the consumer.

While the mobile wallet application is described primarily in reference to mobile communication device 150, which itself is described as being associated with a recipient of a transaction, one skilled in the art would recognize that the mobile wallet application may be provided on a computing device associated with sending customer 110. For example, the mobile communication device 150 depicted and described with reference to FIG. 6 may also or alternatively be used by sending customer 110. For another example, and with brief reference to FIG. 7, the mobile wallet application may be stored in system memory 230 and executed by central processor 228 of a computer apparatus associated with sending customer 110.

The mobile communication device 150 may further include a contactless element 150(*g*), which is typically implemented in the form of a semiconductor chip (or other data storage element) with an associated wireless transfer (e.g., data transmission) element, such as an antenna. Contactless element 150(*g*) is associated with (e.g., embedded within) mobile communication device 150 and data or control instructions transmitted via a cellular network may be applied to contactless element 150(*g*) by means of a contactless element interface (not shown). The contactless element interface functions to permit the exchange of data and/or control instructions between the mobile device circuitry (and hence the cellular network) and an optional contactless element 150(*g*).

Contactless element 150(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 150 and an interrogation device. Thus, the mobile communication device 150 is capable of communicating and transferring data and/or control instructions via both cellular network and near field communications capability.

The mobile communication device 150 can also include a processor 150(*c*) (e.g., a microprocessor) for processing the functions of the mobile communication device 150 and a display 150(*d*) to allow a recipient to see phone numbers and other information and messages. The mobile communication device 150 can further include input elements 150(*e*) to allow a user to input information into the device, a speaker 150(*f*) to allow the user to hear voice communication, music, etc., and a microphone 150(*i*) to allow the user to transmit her voice through the mobile communication device 150. The mobile communication device 150 may also include an antenna 150(*b*) for wireless data transfer (e.g., data transmission) via, e.g., mobile gateway 148.

Figure 7:
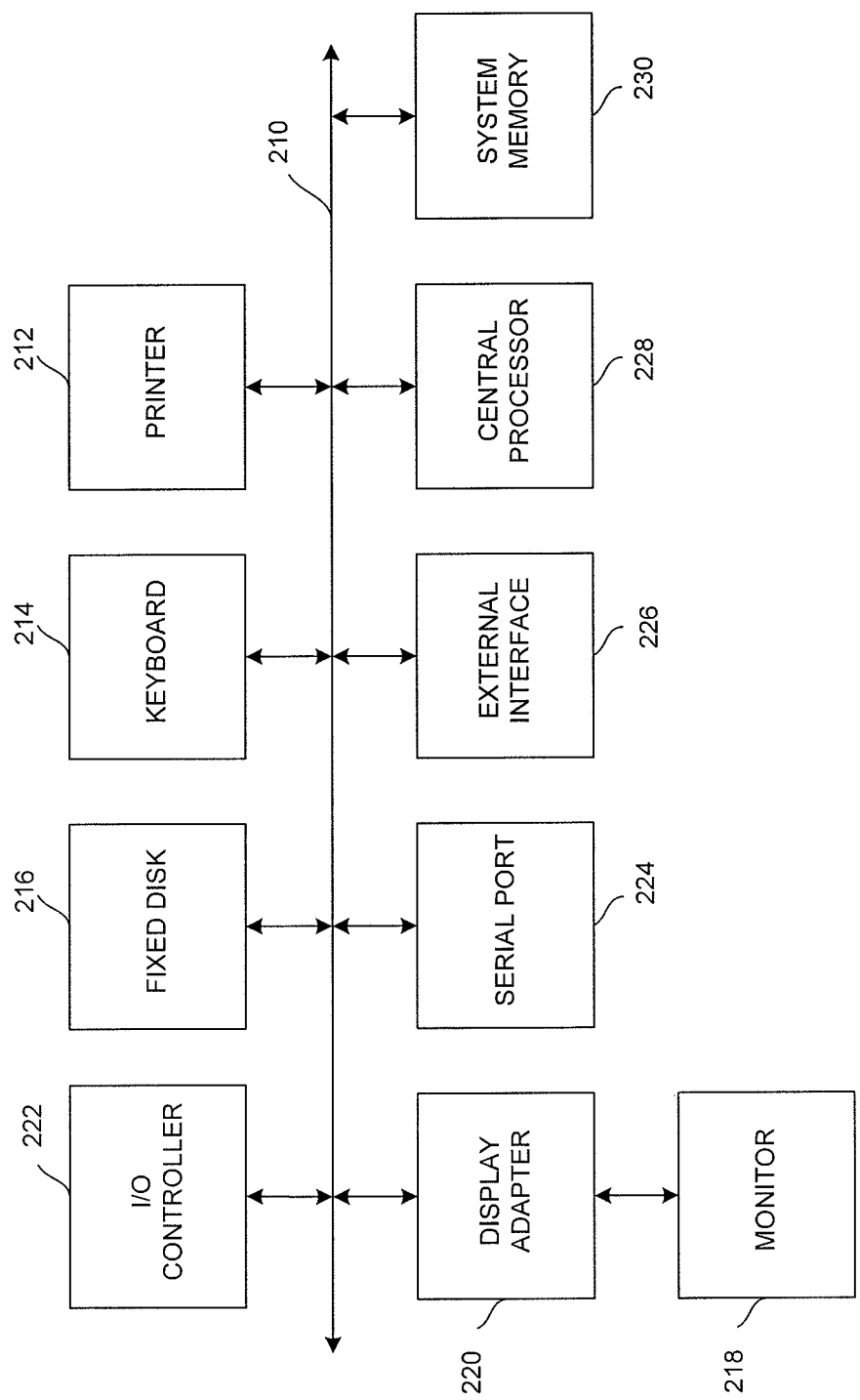
FIG. 7 is a block diagram of subsystems that may be present in computer apparatuses according to embodiments of the invention.

The various participants and elements (e.g., the sending customer, sending institution, payment processing network, mobile network operator, mobile communication device, and call switching entity) in FIG. 1 can operate one or more computer apparatuses (e.g., a computing device associated with the sending customer) to facilitate the functions described herein. Any of the elements in FIG. 1 can use any suitable number of subsystems to facilitate the functions described in the systems and methods described in previous sections. Examples of such subsystems or components are shown in FIG. 7. The subsystems shown in FIG. 7 are interconnected via a system bus 210. Additional subsystems such as a printer 212, keyboard 214, fixed disk 216 (or other memory comprising computer readable media), monitor 218, which is coupled to display adapter 220, and others are shown. Peripherals and input/output (I/O) devices, which coupled to I/O controller 222, can be connected to the computer system by any number of means known in the art, such as serial port 224. For example, serial port 224 or external interface 226 can be used to connect the computer apparatus to a wide area network such as the Internet, a mouse input device, or a scanner. The interconnection via system bus allows the central processor 228 to communicate with each subsystem and to control the execution of instructions from system memory 230 or the fixed disk 216, as well as the exchange of information between subsystems. The system memory 230 and/or the fixed disk 216 can embody a computer readable medium.

One of skill in the art would recognize that modifications, additions, or omissions may be made to system 100 without departing from the scope of the disclosure. The components of system 100 may be integrated or separated according to particular needs. For example, although separate functional blocks are shown for a sending institution and a payment processing network, some entities perform all of these functions and may be included in embodiments of invention. Moreover, the operations of system 100 may be performed by more, fewer, or other system modules. Additionally, operations of system 100 may be performed using any suitable logic comprising software, hardware, other logic, or any suitable combination of the preceding.

II. Exemplary Methods

Figure 8A:
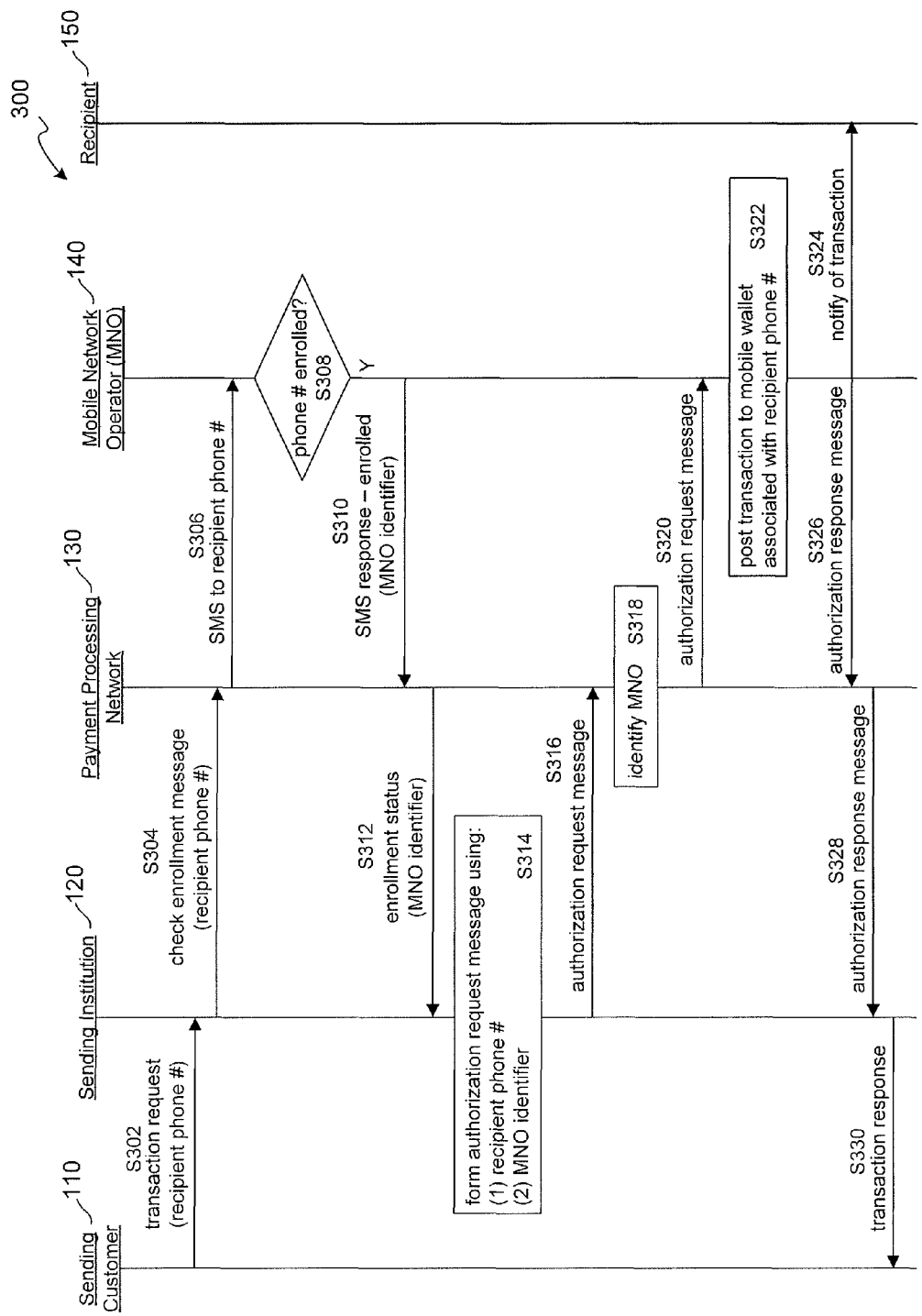
FIG. 8A shows a flow diagram illustrating a method for message routing using a logically independent recipient identifier, where the recipient identifier is a telephone number enrolled to receive transactions, according to a first embodiment of the invention.

FIG. 8A shows a flow diagram 300 illustrating a method for message routing using a logically independent recipient identifier, where the recipient identifier is a telephone number enrolled to receive transactions, according to a first embodiment of the invention.

In step S302, sending customer 110 sends a transaction request to sending institution 120. The transaction request includes a recipient identifier (e.g., a mobile communication device identifier such as a phone number) of the desired recipient of the transaction. For example, the recipient identifier may be a phone number associated with a desired recipient of a financial payment. The transaction request may also include other transaction information, such as an amount of money to be transferred. The transaction request may be sent to the sending institution using one or more of a variety of techniques. In some embodiments, sending customer 110 verbally communicates the transaction request to sending institution 120. In other embodiments, sending customer 110 uses a computing device associated with sending customer 110. For example, sending customer 110 may use a computing device having a software application stored therein that enables the computing device to communicate transaction requests to sending institution. Upon receiving the transaction request, sending institution 120 may extract various information, such as the transaction information, from the transaction request and store it in database 126. Sending institution 120 may also identify the sender account information 126(*a*) associated with the sending customer 110 or, in the event the sender is not a pre-existing customer, may receive such information from the sending customer 110 and store it in database 126 via, e.g., an API provided by the sending institution 120.

In step S304, sending institution 120 generates and sends, to payment processing network 130, a check enrollment message 304. The check enrollment message includes the recipient identifier (e.g., the phone number) provided by sender 110, and is a message that requests payment processing network 130 to check to see whether the recipient identifier (e.g., the phone number) is enrolled to receive transactions. The check enrollment message may be generated by, e.g., enrollment engine 128(*a*), and sent to payment processing network 130 via network interface 122.

In step S306, upon receiving the check enrollment message, payment processing network 130 generates a similar check enrollment message and sends the message to the recipient identifier (in this case, the phone number) provided by the sending institution 120. The check enrollment message generated by payment processing network 130 may not include the recipient identifier. According to one embodiment, the check enrollment message is an SMS message generated by SMS messaging engine 139(*a*). For example, enrollment engine 139(*c*) may receive the check enrollment message from the sending institution 120 and, in response to receiving that message, instruct the SMS messaging engine to generate an SMS message. The SMS message is a message that requests mobile network operator 140 to check to see whether the recipient identifier is enrolled to receive transactions. After being generated, the SMS message may be addressed to the recipient identifier received from sending institution 120, and sent to mobile network operator 140 via mobile gateway 138. In some embodiments, the SMS message may include a transaction flag that indicates to mobile network operator 140 that the SMS message concerns a financial transaction and should not be forwarded to the recipient.

In step S308, upon receiving the SMS message from payment processing network 130, mobile network operator 140 determines whether the recipient identifier (e.g., phone number) which the SMS message was addressed to is enrolled to receive financial transactions. For example, enrollment engine 149(*b*) may search database 146 for a mobile communication device identifier 146(*b*) that corresponds to the received phone number. Upon locating a matching mobile communication device identifier 146(*b*), enrollment engine 149(*b*) may determine whether an associated enrollment flag 146(*c*) indicates that the phone number is enrolled or not enrolled. In this particular embodiment, the enrollment engine 149(*b*) determines that the associated enrollment flag 146(*c*) indicates that the phone number is enrolled.

In some embodiments, at step S308 mobile network operator 140 may also determine whether or not to forward the received SMS message to a mobile communication device associated with the recipient identifier. For example, mobile network operator 140 may store the received SMS message in SMS message buffer 147. Message identification engine 149(*c*) may then analyze the SMS message to determine whether or not it should forward the message to the recipient phone number which the message is addressed to. In analyzing the SMS message, message identification engine 149(*c*) may search for a transaction flag provided in or communicated with the SMS message, where the transaction flag indicates that the SMS message concerns a financial transaction and should not be forwarded to the recipient. In the event message identification engine 149(*c*) locates the transaction flag, message identification engine 149(*c*) prevents the SMS message from being forwarded to the mobile communication device associated with the mobile telephone number which the message is addressed to. Otherwise, the SMS message may be forwarded to the mobile communication device.

In step S310, upon determining that the recipient's identifier is enrolled, mobile network operator 140 generates and sends an SMS response message back to payment processing network 130. For example, enrollment engine 149(b) may generate an SMS response message and send it back to payment processing network 130 via mobile gateway 148. The SMS response message includes a mobile network operator identifier that uniquely identifies the mobile network operator 140. For example, enrollment engine 149(b) may read MNO identifier 146(a) from database 146 and include it in the SMS response message.

In step S312, payment processing network 130 receives the SMS response message and generates and sends an enrollment status message to sending institution 120. For example, enrollment engine 139(c) may receive the SMS response message via mobile gateway 138. Enrollment engine 139(c) may then generate and send the enrollment status message to sending institution 120 via network interface 132. The enrollment status message is a message that indicates whether the recipient's identifier is enrolled to receive a financial transaction, and includes the mobile network operator identifier included in the SMS response message.

In step S314, upon receiving an enrollment status message that indicates that the recipient's identifier is enrolled, sending institution 120 forms an authorization request message that operates to request authorization for a transaction between the sending customer 110 and a recipient associated with the recipient identifier. The authorization request message may include the recipient identifier (e.g., the recipient's phone number) and the mobile network operator identifier. The authorization request message may also include other information such as transaction information (e.g., an amount of money to be transferred) and sender account information (e.g., the sending customer's account number). In one embodiment, message formatting engine 128(b) extracts the mobile network operator identifier from the enrollment status message provided in step S312, and reads other information from sender account information 126(a) and transaction information 126(b) from database 126. Message formatting engine 128(b) then uses this information to form the authentication request message. When forming the authentication request message, messaging formatting engine 128(b) may form the message such that the recipient identifier is separate from the mobile network operator identifier.

In step S316, sending institution 120 sends the authorization request message to payment processing network 130. For example, authorization engine 128(c) may send the message via network interface 122.

In step S318, payment processing network 130 identifies or otherwise determines the mobile network operator (or other non-financial institution) that manages the recipient identifier (e.g., the recipient's phone number). For example, mobile network operator identification engine 139(d) may read the MNO identifier included in the authorization request message and determine the mobile network operator from the MNO identifier.

In step S320, payment processing network 130 routes the authorization request message to the mobile network operator identified by the MNO identifier. For example, authorization engine 139(e) may read the mobile network operator routing table 136(a) stored in database 136 and search the routing table for the identified mobile network operator. Upon finding a match, authorization engine 139(e) may read the network routes associated with the identified mobile network operator. Authorization engine 139(e) may then route the authorization request message to the mobile network operator via network interface 132 in accordance with the stored network route.

In step S322, mobile network operator 140 posts the requested transaction to a mobile wallet associated with the recipient identifier included in the authorization request message. For example, transaction posting engine 149(a) may post the requested transaction to a mobile wallet associated with the recipient phone number.

The mobile wallet may be managed by a variety of suitable entities. In one embodiment, the mobile wallet may be managed by mobile network operator 140. In such a case, database 146 may include account information associated with the recipient identifier. Transaction posting engine 149(a) may search for and identify an account stored in database 146 that corresponds to the recipient identifier, and post the transaction to that account. In another embodiment, the mobile wallet may be managed by an entity other that mobile network operator, such as sending institution 120 or other financial entity. Database 126 may then also include recipient account information (similar to sender account information, but for the recipient). Transaction posting engine 149(a) may then operate to securely communicate the transaction information to sending institution 120 via network interface 122. Upon receipt, sending institution 120 may post the transaction into the recipient's account. In yet another embodiment, the mobile wallet may be managed by the recipient mobile communication device 150. In this case, transaction posting engine 149(a) may securely communicate the transaction information to the recipient mobile communication device 150.

In response to posting the transaction, the entity hosting the mobile wallet may generate an authorization response message. For example, where the hosting entity is mobile network operator 140, authorization engine 149(d) may process the transaction and determine whether the transaction is approved, declined, etc. based on the transaction information and the recipient account information. For another example, where the hosting entity is sending institution 120 or other financial entity, authorization engine 128(c) may process the transaction and determine whether the transaction is approved. Upon determining whether the transaction is approved, the entity hosting the mobile wallet may generate the authorization response message. In the event the entity hosting the mobile wallet is an entity other than mobile network operator 140, the entity may send the authorization response message to the mobile network operator 140.

In some embodiments, when the transaction is successfully posted to the mobile wallet, the mobile wallet may be linked to an account associated with payment processing network 130. In such cases, payment processing network 130 may perform clearance and settlement functions for the transaction. For example, clearing and settlement engine 139(b) may perform transaction clearance and settlement functions for all successfully posted transactions on a nightly basis.

In step S324, mobile network operator 140 may notify the recipient communication device 150 associated with the recipient identifier of one or more of the transaction request and transaction response. For example, authorization engine 149(d) may communicate an SMS message to the mobile communication device 150 by sending the SMS message to the recipient phone number via mobile gateway 148, where the SMS message indicates that a transaction was requested and indicates whether the transaction was approved, denied, etc.

In step S326, mobile network operator 140 sends the authorization response message to payment processing network 130. For example, authorization engine 149(d) may communicate the authorization response message to payment processing network 130 via network interface 142.

In step S328, payment processing network 130 forwards the authorization response message to the sending institution 120. For example, authorization engine 139(e) may receive and forward the authorization response message to sending institution 120 via network interface 132.

In step S330, sending institution 120 may receive the authorization response message and indicate to the sender the contents of the message. For example, authorization engine 128(c) may receive the authorization response message and either display the message to the sending customer located at sending institution 120 or, in some embodiments, send the authorization response to the computing device used by the sending customer 110 to request the transaction. In doing so, sending institution 120 provides a transaction response to the sending customer, the transaction response indicating whether the requested transaction was approved, denied, etc.

Figure 8B:
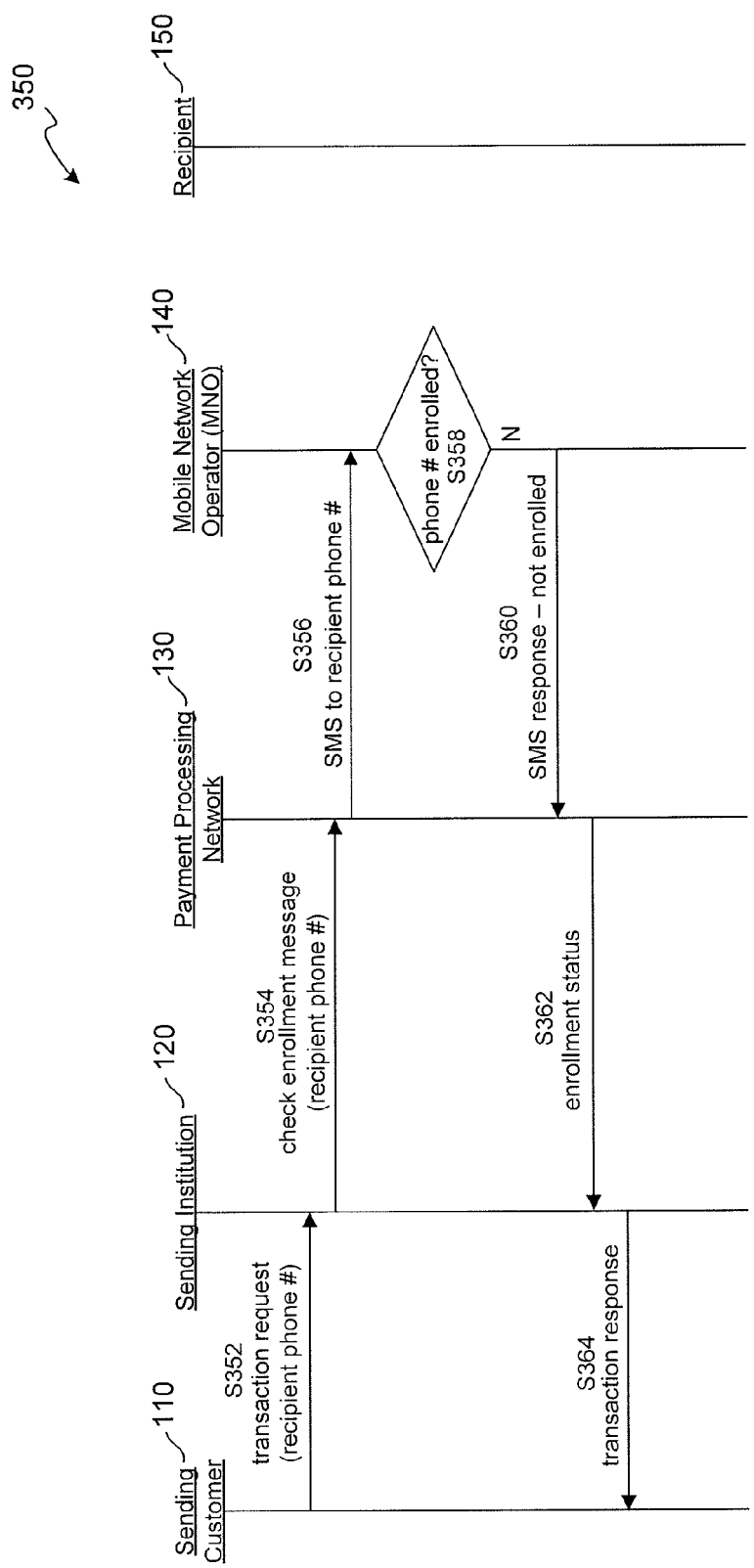
FIG. 8B shows a flow diagram illustrating a method for routing using a logically independent recipient identifier, where the recipient identifier a telephone number that is not enrolled to receive transactions according to a first embodiment of the invention.

FIG. 8B shows a flow diagram 350 illustrating a method for message routing using a logically independent recipient identifier, where the recipient identifier is a telephone number that is not enrolled to receive transactions, according to a first embodiment of the invention.

Steps S352 to S356 are identical to steps S302 to S306 described with reference to FIG. 8A, and thus further description is omitted. In this embodiment, however, in step S358, instead of determining that the recipient identifier is enrolled to receive financial transactions, mobile network operator 140 determines that the recipient identifier is not enrolled to receive financial transactions. Accordingly, mobile network operator 140 proceeds to generate and send an SMS response message that indicates that the recipient identifier is not enrolled. As a result, the transaction request is denied.

Steps S360 to S364 are similar to steps S326 to S330 described with reference to FIG. 8A, except in this case the SMS response message indicates that the recipient identifier (e.g., the recipient's phone number) is not enrolled, and the transaction response message indicates that the transaction request was denied since the recipient identifier is not enrolled to receive financial transactions.

Figure 9A:
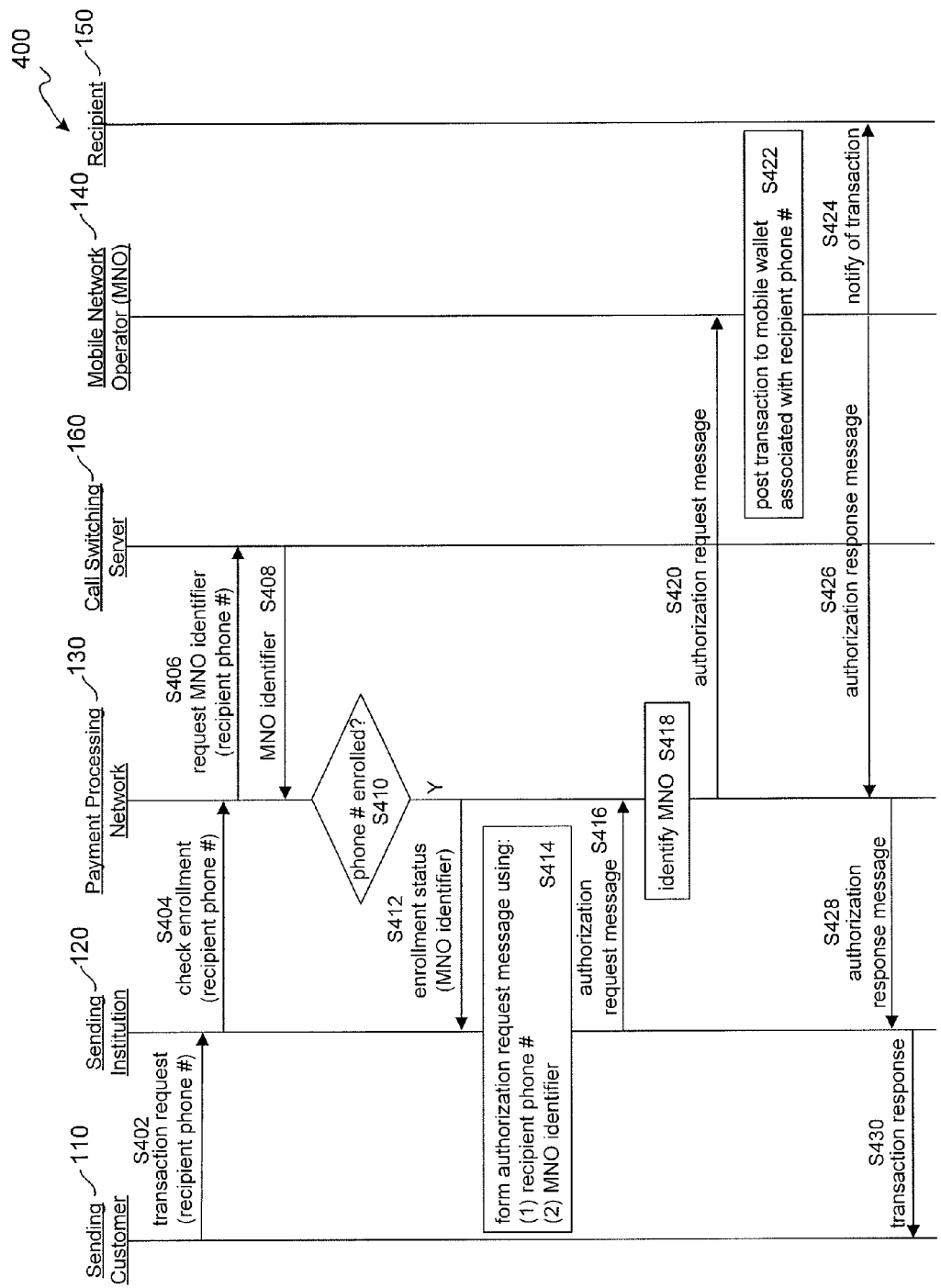
FIG. 9A shows a flow diagram illustrating a method for message routing using a logically independent recipient identifier, where the recipient identifier is a telephone number enrolled to receive transactions, according to a second embodiment of the invention.

FIG. 9A shows a flow diagram 400 illustrating a method for message routing using a logically independent recipient identifier, where the recipient identifier is a telephone number enrolled to receive transactions, according to a second embodiment of the invention.

Steps S402 and S404 are identical to steps S302 to S304 described with reference to FIG. 8A, and thus further description is omitted. Step S406 is similar to S306 described with reference to FIG. 8A, however in this embodiment, payment processing network 130 sends a request for a mobile network operator identifier to call switching server 160. The request includes the recipient identifier received from sending institution 120. For example, the request may be generated by enrollment engine 139(c) and sent to call switching server 160 via network interface 132.

In step S408, in response to receiving the request for an MNO identifier, call switching server 160 locates and sends the requested MNO identifier to payment processing network 130. For example, MNO identification engine 167(b) may search mobile communication device identifiers 166(b) for a match with a mobile communication device. Upon locating a match, MNO identification engine 167(b) may read an MNO identifier 166(a) associated with the matched mobile communication device identifier. Each MNO identifier 166(a) may be associated with a number of mobile communication device identifiers 166(b), where the mobile communication device identifiers (e.g., mobile phone numbers) are managed by the mobile network operator identified by the MNO identifier. Once MNO identification engine 167(b) reads the MNO identifier 166(a) associated with the mobile communication device identifier, MNO identification engine 167(b) may send the MNO identifier to payment processing network 130 via network interface 162.

In step S410, payment processing network 130 determines whether the recipient identifier is enrolled to receive financial transactions. Step S410 is similar to step S308 discussed with reference to FIG. 8A, however in this embodiment this functionality is performed by payment processing network 130 rather than mobile network operator 140. Payment processing network 130 may thus include all of the information and logic discussed with reference to mobile network operator 140 performing step S308, such as enrollment flags 146(c) and the like. In this particular embodiment, the enrollment engine 139(c) determines that the associated enrollment flag indicates that the recipient's phone number is enrolled.

Steps S412 to S430 are identical to steps S312 to S330 described with reference to FIG. 8A, and thus further description is omitted.

Figure 9B:
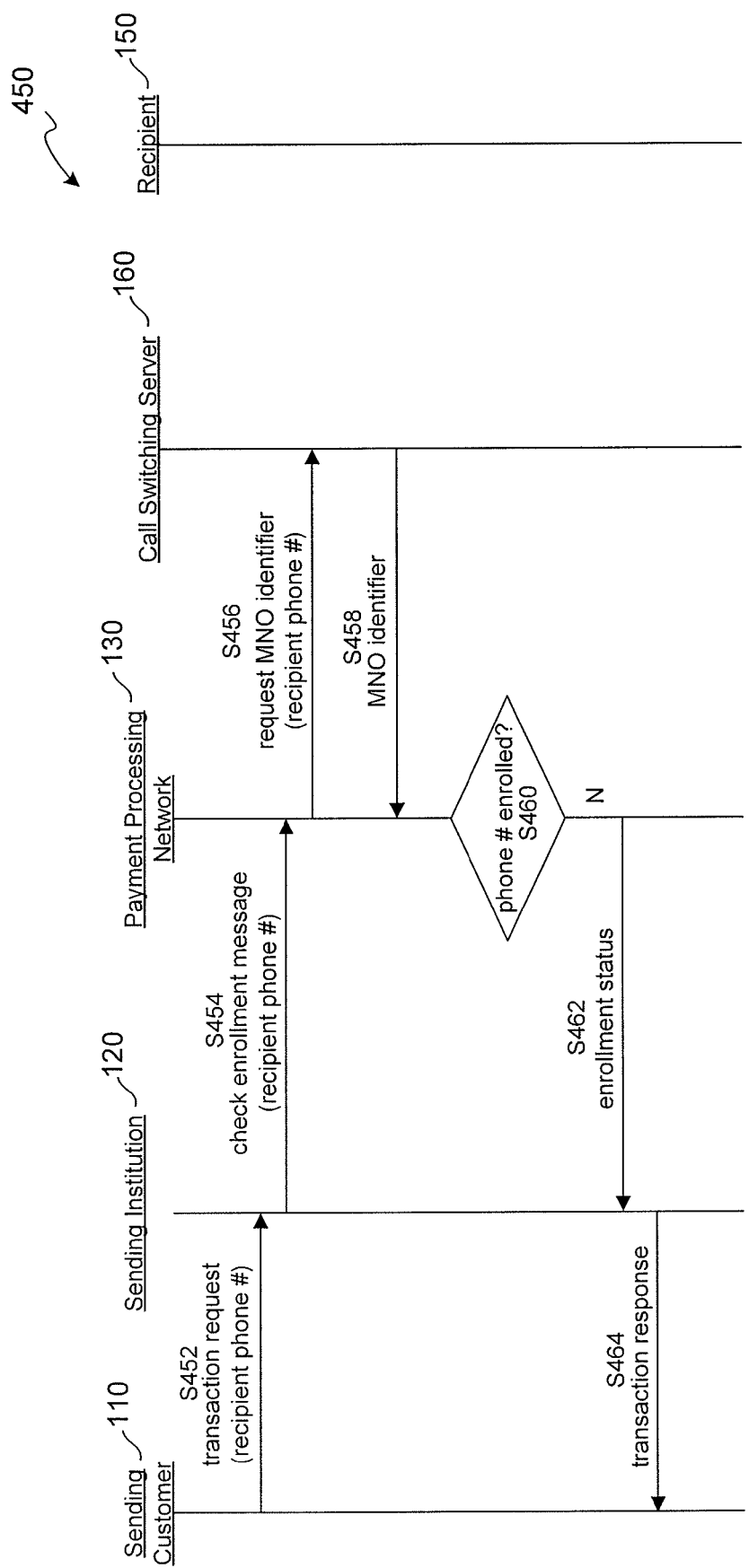
FIG. 9B shows a flow diagram illustrating a method for message routing using a logically independent recipient identifier, where the recipient identifier is a telephone number that is not enrolled to receive transactions according to a second embodiment of the invention.

FIG. 9B shows a flow diagram 350 illustrating a method for message routing using a logically independent recipient identifier, where the recipient identifier is a telephone number that is not enrolled to receive transactions, according to a second embodiment of the invention.

Steps S452 and S454 are identical to steps S352 to S354 described with reference to FIG. 8B, and thus further description is omitted. Steps S456 and S458 are identical to steps S406 and S408 described with reference to FIG. 9A, and thus further description is omitted. Step S460 is similar to step S410 described with reference to FIG. 9A, however in this case payment processing network 130 determines that the recipient identifier is not enrolled. As a result, payment processing network 130 generates an enrollment status message indicating that the recipient identifier is not enrolled, and sends this message to sending institution 120. Accordingly, steps S462 and S464 are identical to steps S362 and S364 described with reference to FIG. 8B, and thus further description is omitted.

Embodiments of the invention are not limited to the above-described embodiments. For example, although separate functional blocks are shown for an issuer computer, payment processing network, and acquirer computer, some entities perform all of these functions and may be included in embodiments of invention. Further, although the methods described show stages or steps in a particular order, embodiments of the invention may include some all or none of the recited steps in any combination without departing from the scope of the invention.

Though the above methods are described using the exemplary situation of a sending customer providing a recipient's mobile telephone number, embodiments of the invention are not so limited. The sending customer may provide other suitable recipient identifiers as described herein. Further, while the methods are described as pushing a financial transaction to a mobile wallet associated with a recipient's mobile telephone number, embodiments of the invention are not so limited. For example, the desired recipient of the transaction may be a merchant, such as a provider of goods or services. The merchant may be issued a unique identifier, such as a mobile communication device identifier, that uniquely identifies the merchant, where the merchant identifier is associated with a financial account such as a mobile wallet. For another example, instead of being sent to a mobile network operator or call switching server, the recipient identifier may be sent to a web server hosting a social networking application, where the web server may post a transaction to an account associated with a user of the social networking application. Embodiments of the invention may thus facilitate not only person to person transactions, but also person to merchant transactions via a variety of servers, systems, or networks that are in communication with and manage accounts of recipients.

III. Exemplary Data Structures

Figure 10:
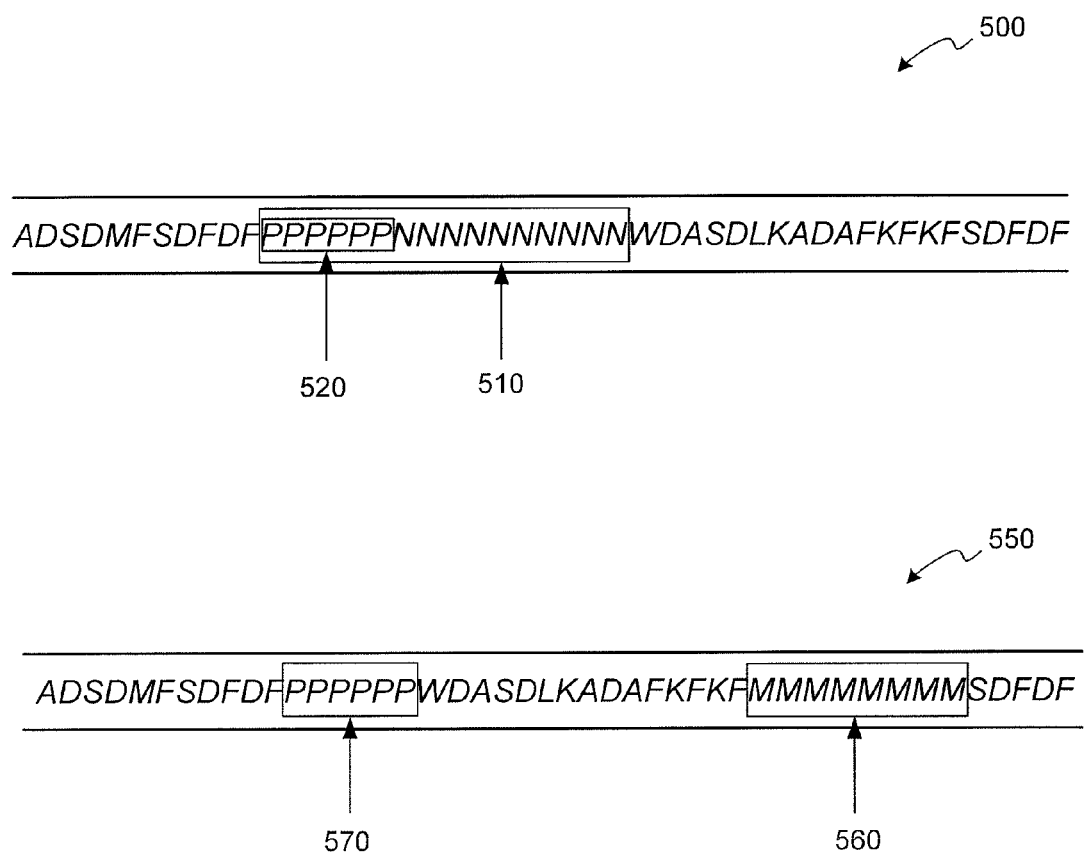
FIG. 10 illustrates authorization request messages in accordance with embodiments of the invention.

FIG. 10 illustrates a portion of an authorization request message in accordance with embodiments of the invention.

A standard authorization request message 500 shows the format of a typical message that may be communicated through a payment processing network. The standard message 500 is typically a 16-digit primary account number (PAN) 510 that operates to identify an account associated with a particular person or entity. The PAN 510 includes an issuer identifier 520, where the issuer identifier 520 is typically the first 6 digits of the PAN and operates to identify an issuer of the account. In this case, the PAN 510 is not separate from the issuer identifier 520, since at least one (actually, all) digits of the issuer identifier 520 form part of the PAN 510.

According to an embodiment, one or more advantages of the present invention may be realized by logically separating the PAN into two components: a recipient identifier 560 and an issuer identifier 570, to form an authorization request message 550. The recipient identifier 560 operates to uniquely identify a person or entity that holds an account. For example, the recipient identifier 560 may be the mobile communication device identifier (e.g., a telephone number). The issuer identifier 570, which is separate from the recipient identifier 560, operates to uniquely identify an issuer of the account. For example, the issuer identifier 570 may be the mobile network operator identifier. In at least some embodiments, the authorization request message formed by sending institution 120 in, e.g., steps S316 and S416, may assume the form of the authorization request message 550. For example, the sending institution 120 may include the recipient phone number received from the sender 110 as recipient identifier 560, and may include the MNO identifier received from payment processing network 130 as issuer identifier 570. In this case, the recipient identifier 560 is entirely separate (or in other words, logically independent from) the issuer identifier 570. The recipient identifier 560 may also be separate from (also logically independent from) the issuer identifier 570 where some, but not all, of the digits of the issuer identifier 570 are also used as the recipient identifier 560.

IV. Additional Embodiments

One skilled in the art would recognize that embodiments of the present invention are not narrowly limited to those explicitly described herein, but also include various methods and apparatus associated with various other elements of the system depicted in FIG. 1.

For example, one method comprises receiving, from a payment processing network, a check enrollment message at a server computer, the check enrollment message being directed to a recipient identifier; determining whether the recipient identifier is enrolled to receive financial transactions; and sending a response message from the server computer to the payment processing network indicating whether the recipient identifier is enrolled to receive financial transactions. In some embodiments, when it is determined that the recipient identifier is enrolled, the server sends the mobile network operator identifier to the payment processing system. In some embodiments, the check enrollment message is an SMS message, and the response message is an SMS response message.

In some embodiments, the method may further comprise analyzing the check enrollment message to determine whether it should be forwarded to the recipient. The method may further comprise receiving an authorization request message, the authorization request message requesting authorization for a transaction between a sender and the recipient. The method may further comprise posting the transaction to a mobile wallet associated with the recipient identifier. In some embodiments, posting the transaction includes sending the transaction to a mobile device associated with the recipient identifier, sending the transaction to a financial entity associated with the recipient, or recording the transaction in an account stored in a database of the server computer.

Embodiments are not limited to methods as described above, but may also include servers that have processors and code stored in a tangible non-transitory computer readable storage medium, where executing of the code by the processors cause the servers to perform the aforementioned method steps.

It should be understood that the embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:
1. A method comprising:
receiving, from a sending institution, an authorization request message at a payment processing network server computer, the authorization request message comprising a mobile network operator identifier and a mobile telephone number, the mobile network operator identifier identifying a mobile network operator via which a mobile telephone having the mobile telephone number operates, the mobile telephone number being associated with a recipient, wherein the authorization request message requests authorization for a financial transaction between a sender and the recipient;

determining, by the payment processing network server computer, the mobile network operator from a number of different mobile network operators based on the mobile network operator identifier;

routing the authorization request message to a mobile network operator server computer associated with the determined mobile network operator; and receiving, from the mobile network operator server computer and at the payment processing network server computer, an authorization response message, the authorization response message indicating whether or not the financial transaction is approved.

2. The method of claim 1 wherein the payment processing server computer is configured to process credit and debit card transactions, and the method further comprises the payment processing network server computer processing credit and debit card transactions.

3. The method of claim 1 wherein the authorization request message is an ISO 8583 type message.

4. The method of claim 1 further comprising:

receiving, from the sending institution, a check enrollment message at the payment processing network server computer, the check enrollment message comprising the mobile telephone number; and determining whether the recipient is enrolled to receive transactions via the mobile telephone having the mobile telephone number.

5. The method of claim 4 wherein determining whether the recipient is enrolled to receive transactions includes:

sending, from the payment procesing network server computer to the mobile network operator using the mobile telephone number, an enrollment request message requesting whether the mobile telephone number is enrolled to receive transactions; and receiving the mobile network operator identifier from the mobile network operator.

6. The method of claim 5 wherein the enrollment request message is a short message service (SMS) message, and the mobile network operator identifier is included in an SMS message.

7. A payment processing server computer comprising:

a processor; and a storage element having instructions stored therein that, when executed by the processor, cause the processor to perform operations including:

receiving, from a sending institution, an authorization request message, the authorization request message comprising a mobile network operator identifier and a mobile telephone number, the mobile network operator identifier identifying a mobile network operator via which a mobile telephone having the mobile telephone number operates, the mobile telephone number being associated with a recipient, wherein the authorization request message requests authorization for a financial transaction between a sender and the recipient;

determining the mobile network operator from a number of different mobile network operators based on the mobile network operator identifier;

routing the authorization request message to a mobile network operator server computer associated with the determined mobile network operator; and receiving, from the mobile network operator server computer, an authorization response message, the authorization response message indicating whether or not the financial transaction is approved.

8. The server computer of claim 7 wherein the operations further include processing credit and debit card transactions.

9. The server computer of claim 7 wherein the authorization request message is an ISO 8583 type message.

10. The server computer of claim 7 wherein the operations further include:

receiving, from the sending institution, a check enrollment message, the check enrollment message comprising the mobile telephone number; and determining whether the recipient is enrolled to receive transactions via the mobile telephone having the mobile telephone number.

11. The server computer of claim 10 wherein determining whether the recipient is enrolled to receive transactions includes:

sending, to the mobile network operator using the mobile telephone number, an enrollment request message requesting whether the mobile telephone number is enrolled to receive transactions; and receiving the mobile network operator identifier from the mobile network operator.

12. The server computer of claim 11 wherein the enrollment request message is a short message service (SMS) message, and the mobile network operator identifier is included in an SMS message.

13. A method comprising:

receiving, at a sending institution server computer, from a sender requesting authorization for a financial transaction between the sender and a recipient, a mobile telephone number associated with the recipient;

receiving, from a mobile network operator server computer via which a mobile telephone having the mobile telephone number operates, a mobile network operator identifier identifying the mobile network operator;

determining, by the sending institution server computer, whether the mobile telephone number is enrolled so that the recipient can receive financial transactions; and in response to determining that the mobile telephone number is enrolled so that the recipient can receive financial transactions:

generating, by the sending institution server computer, an authorization request message comprising the mobile telephone number and the mobile network operator identifier, the authorization request message requesting authorization of the financial transaction between the sender and the recipient; and sending, from the sending institution server computer, the authorization request message to authorize the financial transaction between the sender and the recipient.

14. The method of claim 13 wherein determining whether the mobile telephone number is enrolled includes sending a check enrollment message to a payment processing network and receiving in response thereto an enrollment status message, the check enrollment message including the mobile telephone number, the enrollment status message indicating whether or not the mobile telephone number is enrolled.

15. The method of claim 14 wherein the enrollment status message includes the mobile network operator identifier when the enrollment status message indicates that the mobile telephone number is enrolled.

16. The method of claim 13 wherein the authorization request message further comprises transaction information.

17. The method of claim 13 wherein the authorization request message further comprises sender account information.

18. The method of claim 13 wherein the authorization request message is sent to a payment processing network.

19. The method of claim 13 further comprising receiving an authorization response message indicating whether or not the transaction between the sender and the recipient is authorized, and communicating the contents of the authorization response message to the sender.

20. The method of claim 19 wherein the authorization response message is received from a payment processing network.

* * * * *